United States Patent

Aikawa et al.

[11] Patent Number: 5,941,932
[45] Date of Patent: Aug. 24, 1999

[54] MAP DISPLAY APPARATUS

[75] Inventors: Tetsumori Aikawa; Atsushi Tanaka, both of Sagamihara, Japan

[73] Assignee: Xanavi Information Corporation, Kanagawa, Japan

[21] Appl. No.: 08/660,407

[22] Filed: Jun. 7, 1996

[30] Foreign Application Priority Data

Jun. 9, 1995 [JP] Japan .................................. 7-143684

[51] Int. Cl.⁶ ................................................ G06F 165/00
[52] U.S. Cl. .......................... 701/208; 701/207; 340/990; 340/995
[58] Field of Search ..................................... 701/200, 201, 701/202, 207, 208, 209, 211; 73/178 R; 340/988, 990, 995

[56] References Cited

U.S. PATENT DOCUMENTS

| | | | |
|---|---|---|---|
| 4,608,656 | 8/1986 | Tanaka et al. ........................... | 340/988 |
| 4,940,972 | 7/1990 | Mouchot et al. ........................ | 340/747 |
| 5,161,886 | 11/1992 | De Jong et al. ........................ | 340/995 |
| 5,732,385 | 3/1998 | Nakayama et al. ...................... | 701/201 |
| 5,742,924 | 4/1998 | Nakayama ............................... | 701/208 |
| 5,748,109 | 5/1998 | Kosaka et al. .......................... | 701/202 |
| 5,757,290 | 5/1998 | Watanabe et al. ....................... | 701/200 |

FOREIGN PATENT DOCUMENTS

| | | |
|---|---|---|
| 0 378 271 | 7/1990 | European Pat. Off. . |
| 0 660 290 | 6/1995 | European Pat. Off. . |
| 2 634 707 | 2/1990 | France . |
| 3-225391 | 10/1991 | Japan . |

Primary Examiner—Gary Chin
Attorney, Agent, or Firm—Evenson, McKeown, Edwards & Lenahan, P.L.L.C.

[57] ABSTRACT

A map display apparatus according to the present invention, has a data conversion circuit that converts a plane map data to a bird's-eye view map data in a specific bird's-eye viewing direction in order to display a map in a bird's-eye view format; and an operating member that is operated to change the specific bird's-eye viewing direction.

10 Claims, 11 Drawing Sheets

WHEN THE JOY-STICK HAS BEEN OPERATED TO THE RIGHT

WHEN THE JOY-STICK HAS BEEN OPERATED TO THE LEFT

MAP DISPLAY APPARATUS

BACKGROUND OF THE INVENTION

1. Field of the Invention

The present invention relates to a map display apparatus that is capable of displaying road information or the like as a bird's-eye view map in the bird's eye view format obtained by looking down diagonally at a map in a specific direction from above.

2. Description of the Prior Art

There are map display apparatuses for vehicles in the prior art that display a road map on a display device in the so called bird's-eye view display format, whereby a road map in the vicinity of the current position of the vehicle is displayed magnified compared to portions of the map in the distance (refer to U.S. Pat. No. 5,161,886, for instance). The apparatus disclosed in the above-mentioned application sets a viewpoint to the rear of the current position of the vehicle and displays the road state on the ground from this viewpoint looking down in the advancing direction of the vehicle on a screen of a display device. In such a bird's-eye view display, map information in the vicinity of the current vehicle position can be displayed enlarged, and in addition, since a wide range of area from the current position to distant positions can be displayed, it is easy to visually read route connections on the road map. Another advantage is achieved when the display direction, i.e., the direction in which the road map is looked down upon, is set to match the advancing direction of the vehicle, in that intersections and the like on the path of the vehicle's advance can be observed in detail, making the road map very easy to see when the path of advance is a linear path.

However, in a road display employing the bird's-eye view format, the closer to the position of the viewpoint, the more magnified is the display of the road map becomes and, at the same time, the range of the road map displayed on the screen is reduced. Since the current position of the vehicle is near the viewpoint, only a limited range in the vehicle advancing direction is displayed for the vicinity of the current vehicle position and, as a result, the road map in the vicinity of the current vehicle position cannot be studied thoroughly.

SUMMARY OF THE INVENTION

An object of the present invention is to provide a map display apparatus with which, when a map is displayed in the bird's-eye view format, the display direction of the bird's-eye view map can be changed freely to ensure that the state in the vicinity of the current position can be accurately understood.

In order to attain this object, a map display apparatus according to the present invention, comprises: a road map storage device that stores road map data related to a road map; a vehicle position detection device that detects a current position of a vehicle; a monitor that displays a road map in a bird's-eye view format based upon bird's-eye view map data that are input; a bird's-eye view map data creation circuit that creates the bird's-eye view map data in the bird's-eye view format obtained by looking down at the road map diagonally in a predefined specific direction from a viewpoint above a vicinity of the current position of the vehicle on the road map, based upon the road map data read from the road map storage device and the current position of the vehicle detected by the vehicle position detection device; a direction change operating member that is operated in order to change the specific direction that is used when the bird's-eye view map data is created; and a control circuit that controls the bird's-eye view map data creation circuit so as to create the bird's-eye view map data in the specific direction which is changed in response to an operation of the direction change operating member when the direction change operating member has been operated.

Another map display apparatus according to the present invention, comprises: a data conversion circuit that converts a plane map data to a bird's-eye view map data in a specific bird's-eye viewing direction in order to display a map in a bird's-eye view format; and an operating member that is operated to change the specific bird's-eye viewing direction.

DESCRIPTION OF THE PREFERRED EMBODIMENTS

Figure 1:
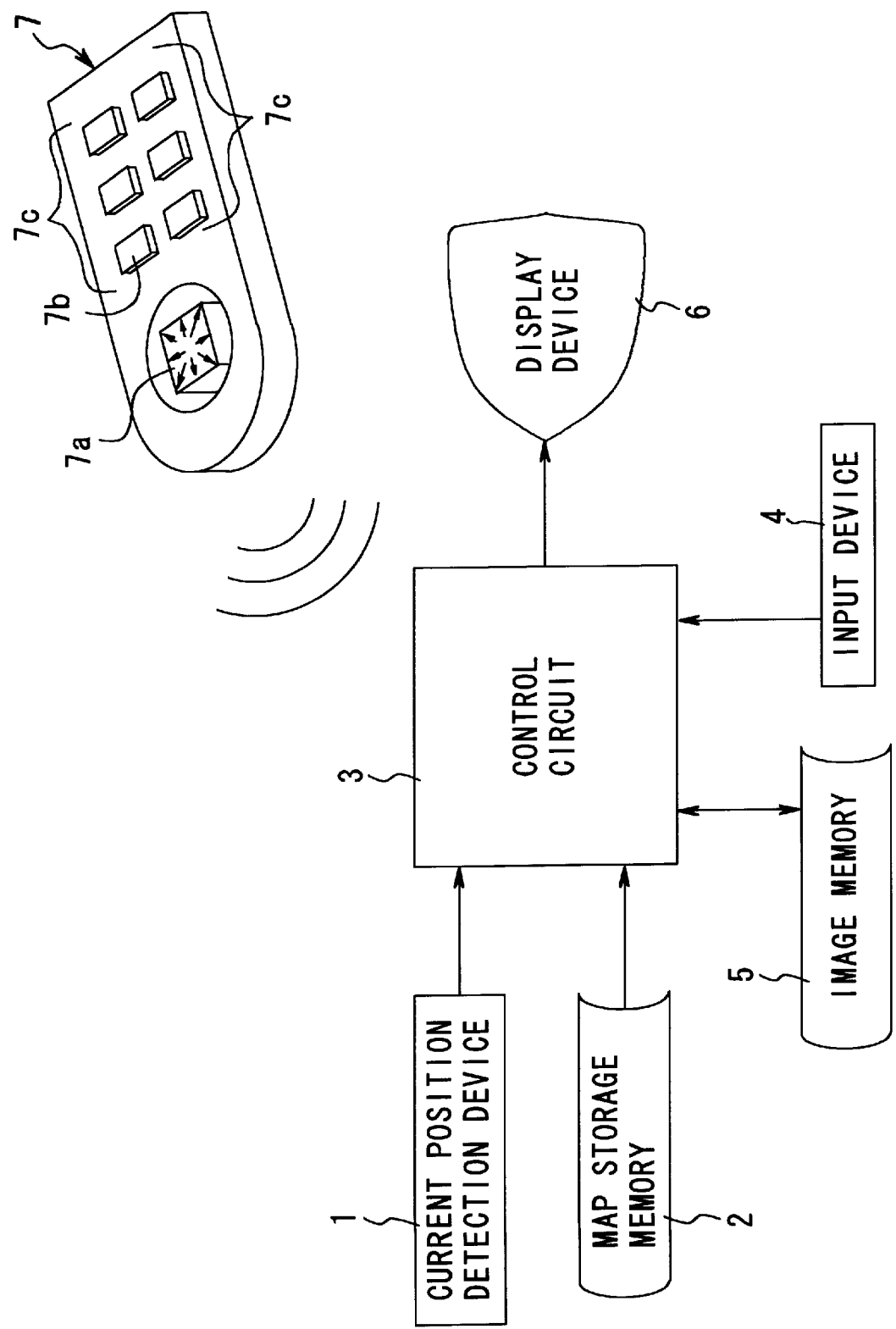
FIG. 1 is a block diagram of an embodiment of the map display apparatus according to the present invention.

FIG. 1 is a block diagram of an embodiment of the map display apparatus for vehicles according to the present invention. In FIG. 1, reference number 1 indicates a current position detection device that detects the current position of a vehicle and is constituted with, for instance, a bearing sensor that detects the advancing bearing of the vehicle, a vehicle speed sensor that detects the speed of the vehicle, a GPS sensor that detects GPS signals sent from a GPS (Global Positioning System) satellite and the like. Reference number 2 indicates a map storage memory that stores road map data and is used to temporarily store map data obtained by reading out road map data in, for instance, a CD ROM, with a read device. The road map data stored in the map storage memory 2 are mainly constituted with road data, name data, background data and the like. Furthermore, road map data at a plurality of map scales are stored in the map storage memory 2.

Reference number 3 indicates a control circuit, constituted with a microprocessor and its peripheral circuits that controls the entire apparatus. Reference number 4 indicates an input device, constituted with various types of push-button switches provided on the panel surface to the left and right of the display device 6, which is to be detailed later. Reference number 5 indicates an image memory for storing image data and reference number 6 indicates the display device, which displays various types of information based upon the image data stored in the image memory 5.

Reference number 7 indicates a remote control device provided with a joy-stick 7a that may be operated in 8 directions, i.e., up, down, left, right, diagonally upward and to the right, diagonally downward and to the right, diagonally upward and to the left and diagonally downward and to the left, a current position button 7b for issuing a command to display the vehicle current position and a button group 7c for issuing various other commands. While it is desirable that the remote control device 7 employ the wireless remote control method, it may also employ the wired remote control method. A joy-stick similar to that of the remote control device may be mounted on the display panel surface.

<Main Processing Flowchart>

Figure 2:
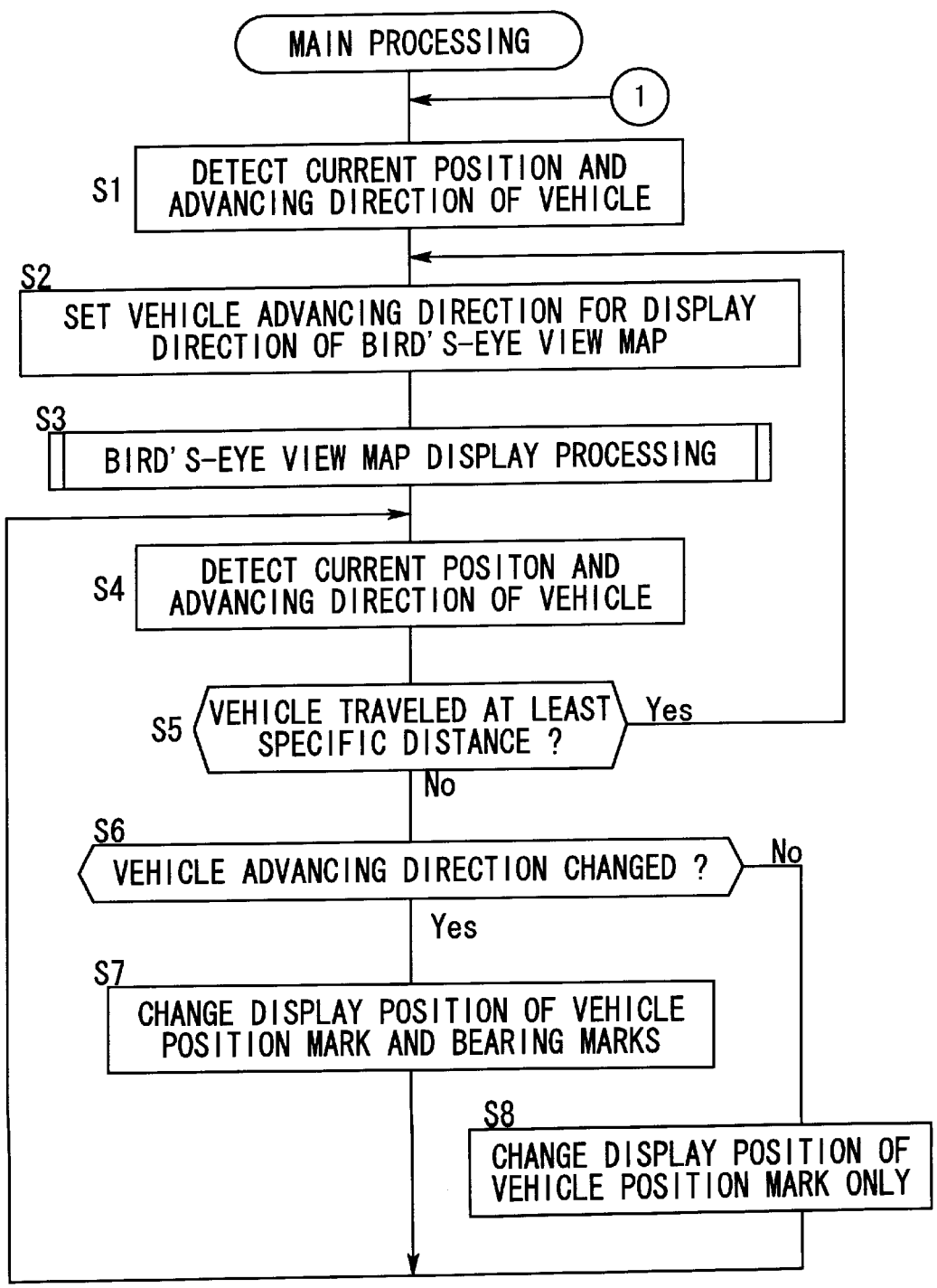
FIG. 2 is a flowchart illustrating the main processing performed by the control circuit.

FIG. 2 is a flowchart showing the main processing performed by the control circuit 3. The processing starts when the ignition key of the vehicle is operated to the ignition-on position. In step S1, the current position and the advancing direction of the vehicle are detected with the current position detection device 1. For instance, if a GPS sensor is internally provided at the current position detection device 1, the so-called GPS navigation method uses the GPS sensor to detect the current position, whereas, if a vehicle speed sensor and a bearing sensor are provided instead of a GPS sensor, the so-called self contained navigation method determines the traveling locus of the vehicle to detect the current position. Alternatively, the current position may be detected by combining the GPS method and the self contained navigation method. The advancing direction of the vehicle is detected by using a bearing sensor or a geomagnetic sensor (not shown).

In step S2, in order to display a bird's-eye view map in the advancing direction of the vehicle, the display direction of the bird's-eye view map is determined based upon the advancing direction of the vehicle detected in step S1. In step S3, a bird's-eye view map display processing is performed. The bird's-eye view map display processing is to be explained in detail later, in reference to FIG. 3.

In step Si, as in step Si, the current position and the advancing bearing of the vehicle are detected. In step S5, a decision is made as to whether or not the vehicle has traveled at least a specific distance. The traveling distance can be calculated based on a signal from the vehicle speed sensor or the like. If an affirmative decision is made in step S5, the operation returns to step S2, whereas if a negative decision is made, the operation proceeds to step S6. In step S6, a decision is made as to whether or not the advancing direction of the vehicle has changed. The decision making in regard to any change in the advancing direction of the vehicle can be performed based upon signals that are successively detected by the bearing sensor or the geomagnetic sensor. If an affirmative decision is made in step S6, the operation proceeds to step S7, in which the vehicle mark and the bearing marks are redrawn without updating the road map, and then the operation returns to step S4.

In this instance, the vehicle mark refers to a mark that indicates the current position and the advancing direction of the vehicle on the display screen and the bearing marks indicate the display direction of the bird's-eye view map and the advancing direction of the vehicle. The display direction of the bird's-eye view map is indicated with the alphabetical letters E, W, S and N indicating the bearings east, west, south and north and the advancing direction of the vehicle is indicated with filled triangles above and below the alphabetical letters E, W, S or N. In other words, in step S7, the display position and the display direction of the vehicle mark are changed in correspondence to the current position and the advancing direction of the vehicle and the bearing marks are also changed in correspondence to the advancing direction of the vehicle. The bearing marks are to be described in detail later.

If a negative decision is made in step S6, the operation proceeds to step S8, in which only the display position of the mark indicating the current position of the vehicle is changed in correspondence to the distance traveled by the vehicle, without changing its display direction, and then the operation returns to step S4.

<Bird's-eye view map Processing Flowchart>

Figure 3:
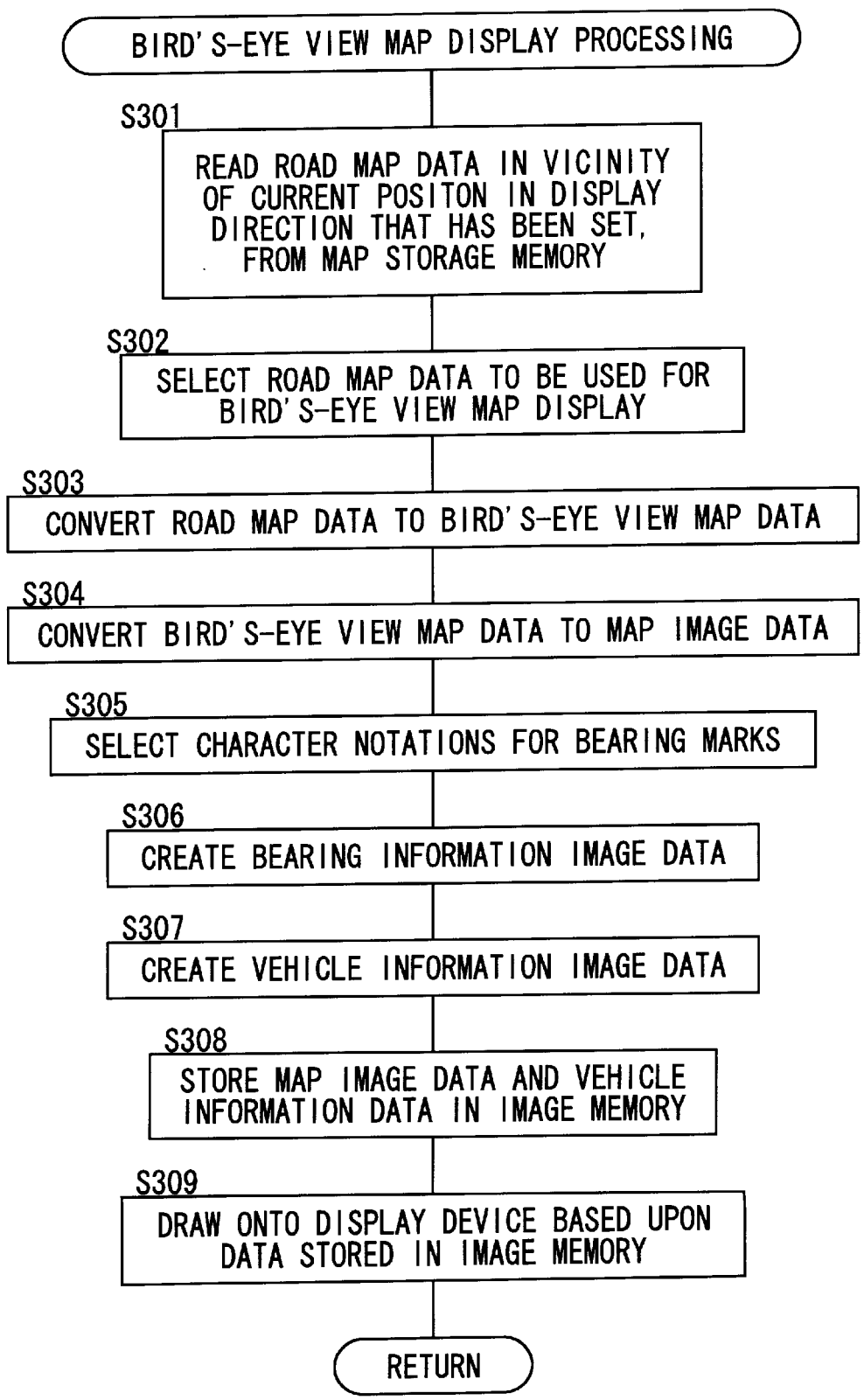
FIG. 3 is a flowchart illustrating the bird's-eye view map display processing performed by the control circuit.

FIG. 3 is a flowchart showing details of the processing performed in step S3. In step S301, based on the current position detected in step S1 and the display direction determined in step S2 of the main flowchart, road map data for the vicinity of the current position in the display direction that has been set are read from the map storage memory 2. For instance, road map data for an area of several tens of square kilometers including the current position are read. In step S302, the data that are to be used for displaying a bird's-eye view map are selected from the road map data read in step S301. In step S303, the road map data selected in step S302 are converted to bird's-eye view map data. The data conversion is to be detailed later. In step S304, the bird's-eye view map data obtained through the conversion performed in step S303 are converted to the final map image data required for display on the display device 6.

Figure 4:
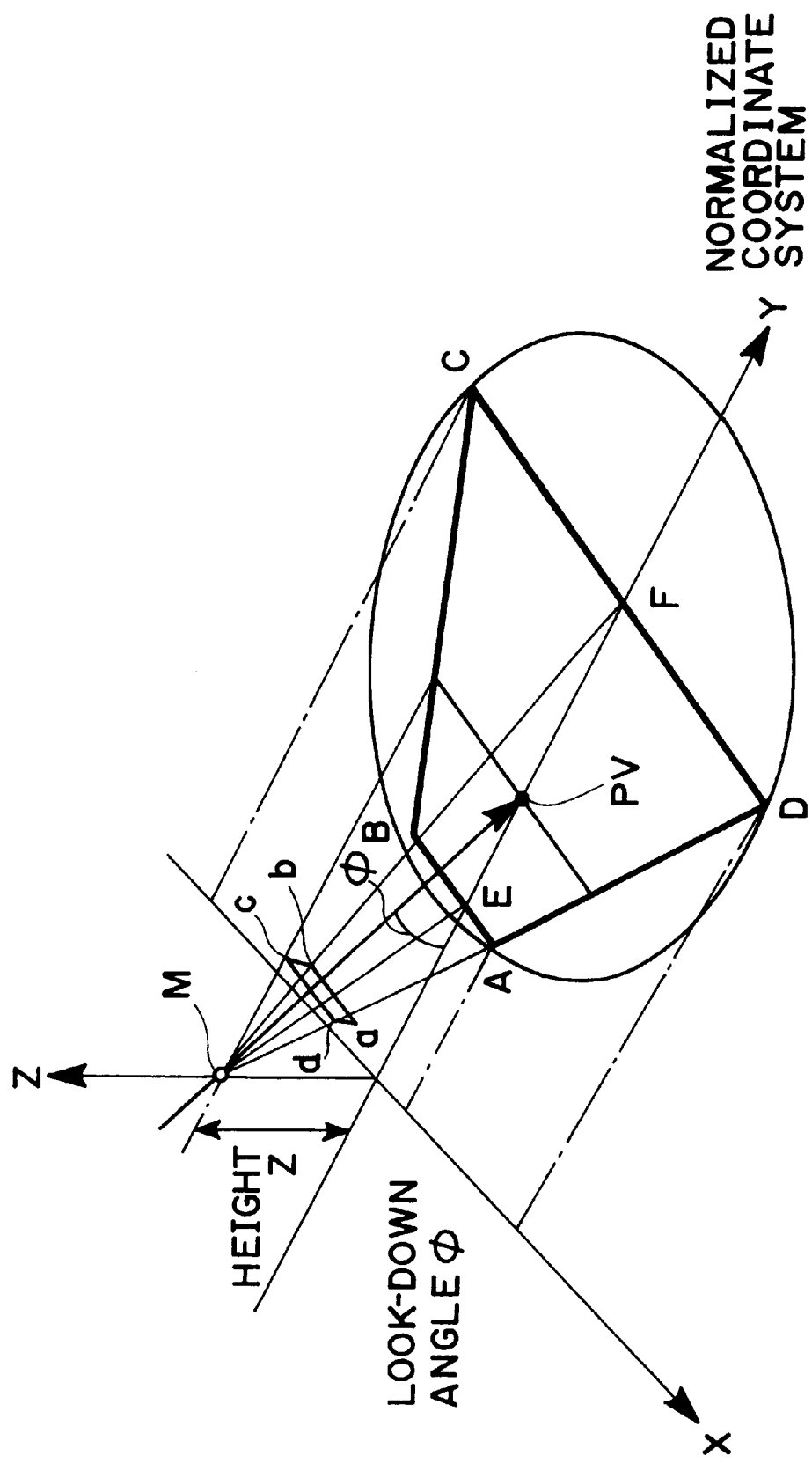
FIG. 4 is an illustration of the method employed for conversion to bird's-eye view map data.
Figure 5:
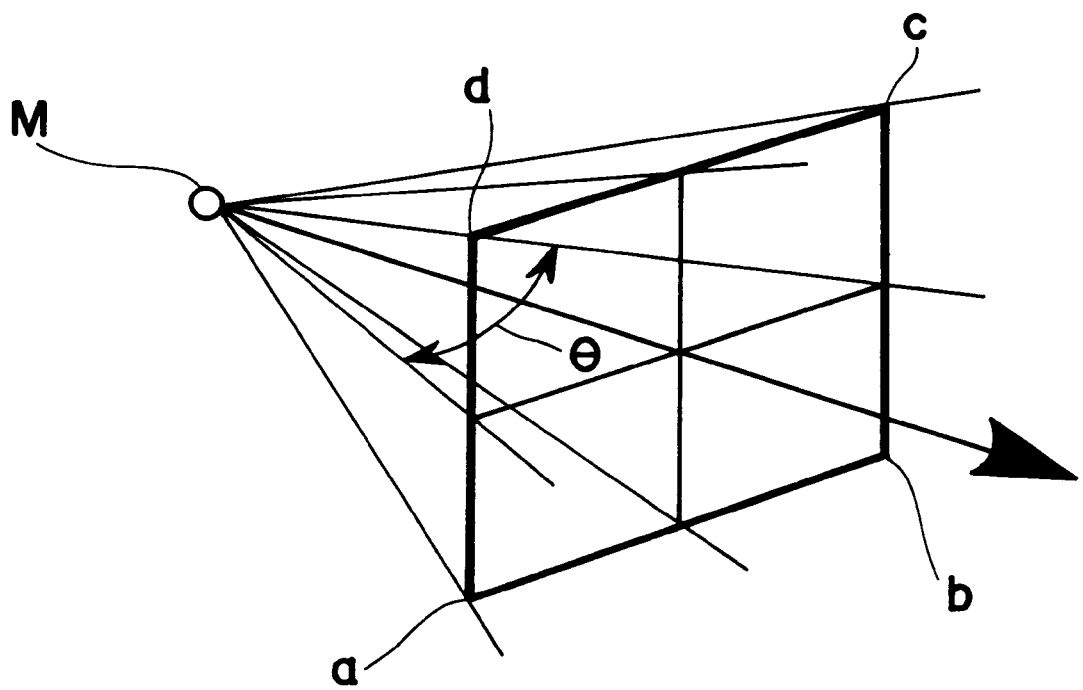
FIG. 5 is an enlargement of the rectangular area abcd shown in FIG. 4.

FIG. 4 illustrates the conversion of road map data to bird's-eye view map data and shows an example in which a road map constitutes an X_Y plane, with a viewpoint M set on a Z axis, which runs at a right angle to the X_Y plane, with the look-down angle from the viewpoint M, i.e., the angle formed by a line connecting the viewpoint M and the vehicle current position PV relative to the X_Y plane, set at Φ. A rectangle abcd in the figure indicates the display range on the display device 6 as shown in an enlargement in FIG. 5 and the trapezoidal area ABCD in FIG. 4 indicates the road map range to be displayed on the display device 6. In step S303 mentioned earlier, in order to display the entire road map data inside the trapezoidal area ABCD on the display device 6, the height Z of the viewpoint M, the look-down angle Φ from the viewpoint M and the aspect angle θ from the viewpoint are first determined and then using these parameters, the bird's-eye view map data to be projected in the rectangular area abcd in FIG. 5 are created. At this time, the look-down angle Φ is set ensuring that the advancing direction of the vehicle extends in the vicinity of the central line connecting the middle points of the upper side and the lower side of the display screen of the display device 6.

Figure 8A:
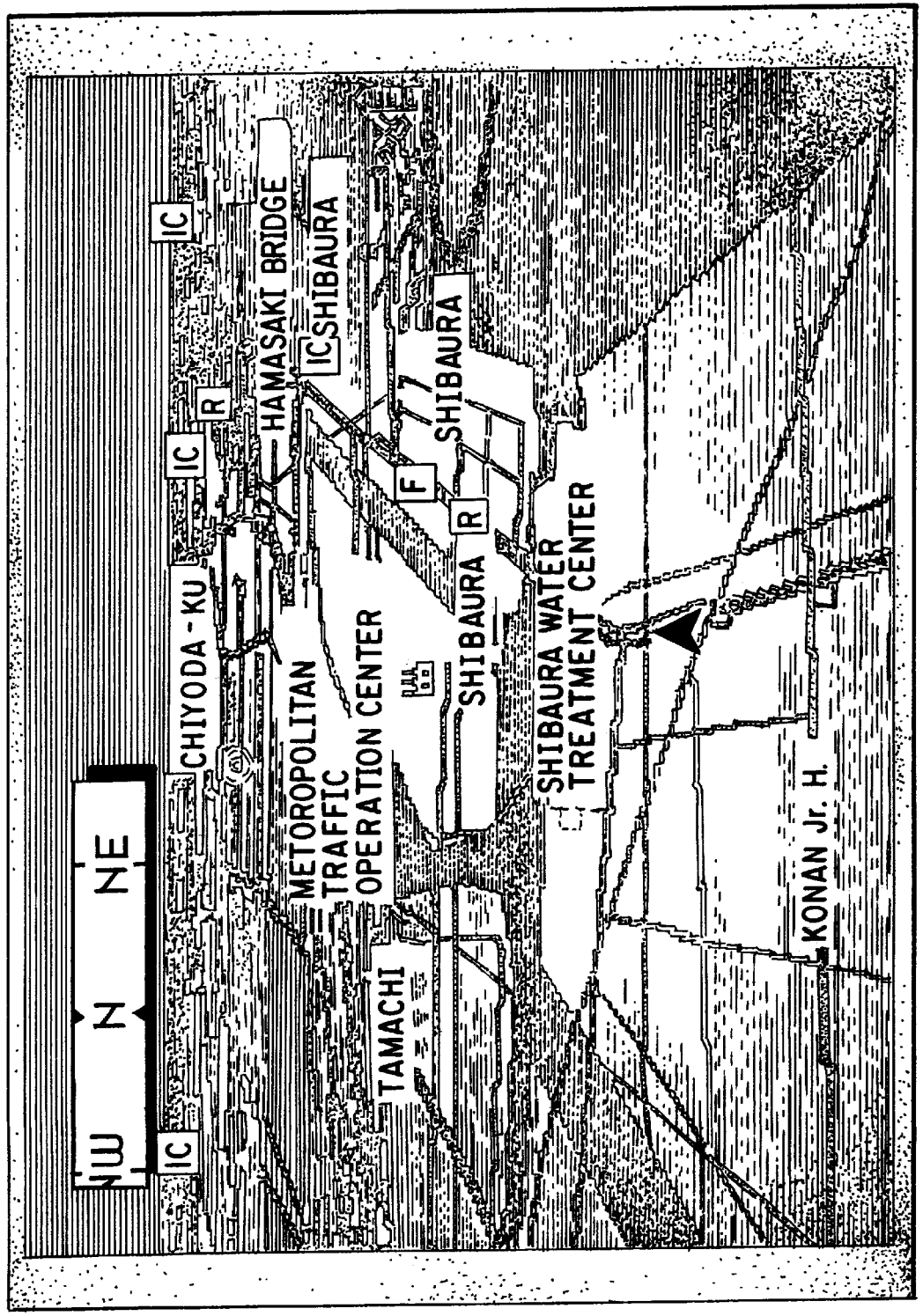
FIG. 8A is an example of bird's-eye view map display.

In step S305, the character notations for the bearing marks to be displayed in the upper left area of the display screen are selected. As explained earlier, the bearing marks indicate the display direction of the bird's-eye view map and the advancing direction of the vehicle and are displayed in the upper left area of the display screen as bearing information, which is constituted of a set of three character notations from among the eight character notations listed below. For instance, if the display direction is north, which matches the advancing direction of the vehicle, NW and NE are displayed to the left and right of N at the middle, as shown in FIG. 8A and, in combination with that, filled triangles indicating the advancing direction of the vehicle are displayed above and below the N.

1. N indicates that the north direction is displayed
2. NE indicates that the north-east direction is displayed
3. E indicates that the east direction is displayed
4. SE indicates that the south-east direction is displayed 5. S indicates that the south direction is displayed
6. SW indicates that the south-west direction is displayed
7. W indicates that the west direction is displayed
8. NW indicates that the north-west direction is displayed In step S306, the image data required for displaying the bearing information, constituted of a set of three selected bearings, on the display screen, are created. In step S307, the vehicle information image data required for displaying the vehicle mark on the display device 6 are created.

In step S308, the map image data, the bearing information image data and the vehicle information image data that were created in steps S304, S306 and S307 respectively are stored in the image memory 5. In step S309, the screen of the display device 6 is drawn based upon the data stored in the image memory 5. With this, the bird's-eye view map, as shown in FIG. 8A, is displayed on the display device 6.

<Joy-Stick Operation Processing Flowchart>

Figure 6:
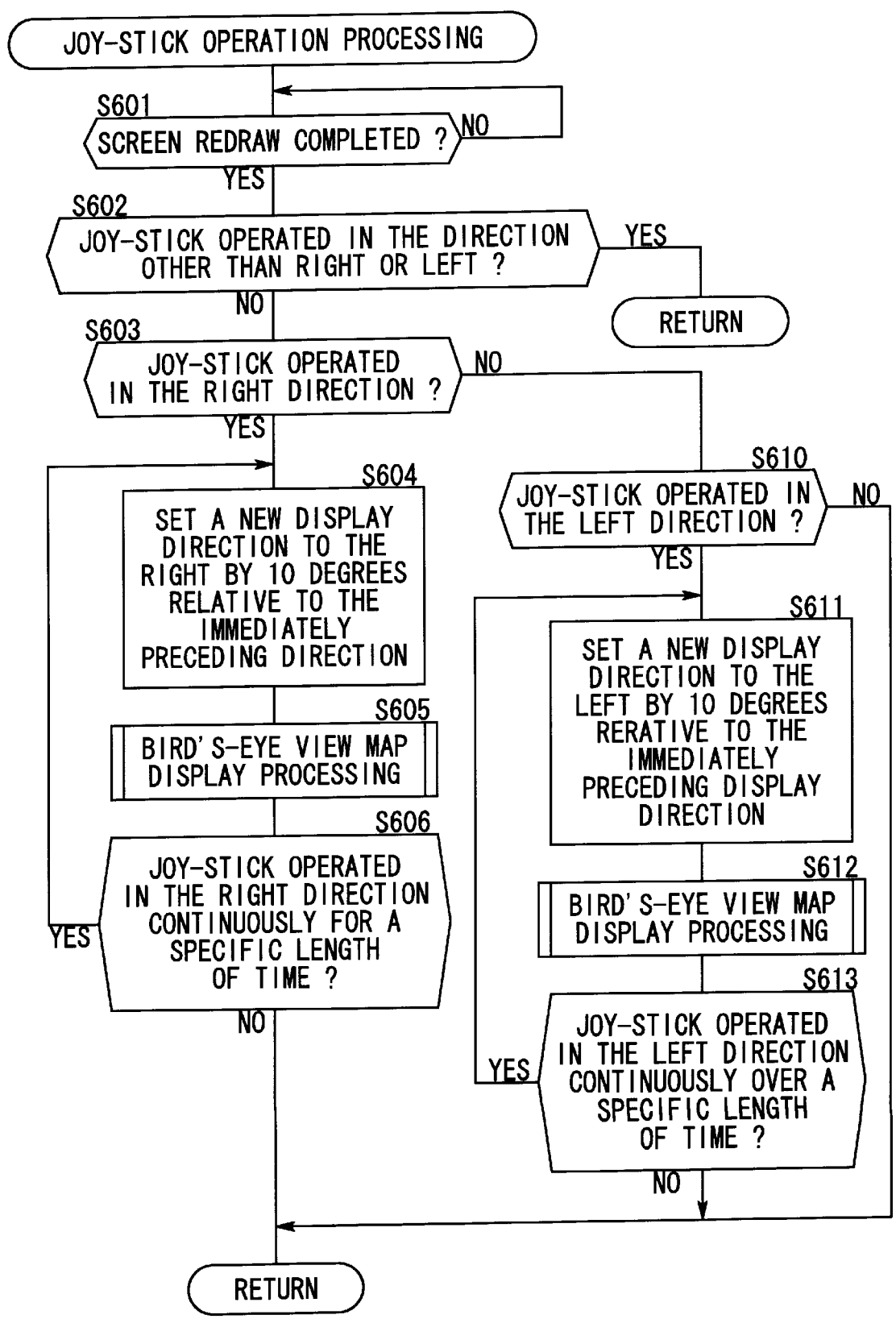
FIG. 6 is a flowchart illustrating the interruption processing performed when the joy-stick has been operated.

FIG. 6 is a flowchart showing joy-stick operation processing. This program is started up when the control circuit 3 receives an interrupt signal generated by operation of the joy-stick 7a. In step S601, the operation waits for the screen redraw to be completed. With this, even if the joy-stick 7a is operated during updating of the screen, the execution of this processing is held in standby until the screen is updated. When the screen redraw is completed, the operation proceeds to step S602, in which a decision is made as to the direction in which the joy-stick 7a has been operated. In other words, if the joy-stick has been operated in a direction other than the right or left direction, processing is terminated, whereas if the joy-stick has been operated to the right or left, the operation proceeds to step S603. If it is decided that the joy-stick has been operated in the right direction in step S603, the operation proceeds to step S604, in which a new display direction is set toward the right by 10 degrees relative to the immediately preceding display direction and the bird's-eye view map display processing is executed in step s605. Then, if it is decided in step S606 that the joy-stick 7a has been operated in the right direction continuously for a specific length of time, the operation returns to step S604, whereas, if a negative decision is made in step S606, the processing is terminated and the operation returns.

Figure 7A:
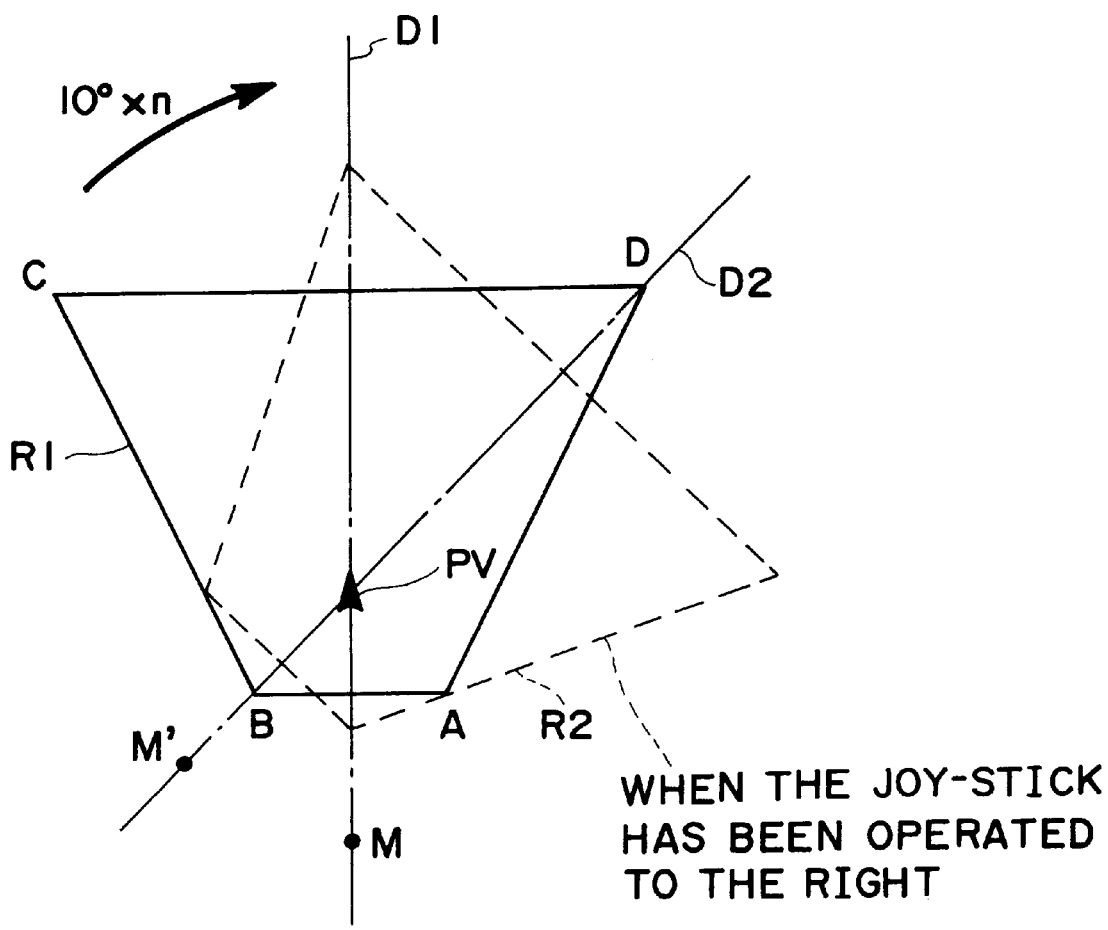
FIG. 7A is an illustration of change in the display direction of the bird's-eye view map.

FIG. 7A illustrates the display direction for the bird's-eye view map when the joy-stick 7a has been operated in the right direction. If the display direction and the display range before the operation of the joy-stick 7a are designated D1 and R1 respectively, the display direction D2 is a direction obtained by rotating the display direction D1 to the right by (10×n) degrees around the vehicle current position PV and the display range R2 is the area enclosed by the broken lines. Consequently, if the display direction D1 is the vehicle advancing direction, more of the road state on the right hand side relative to the advancing direction is displayed within the screen.

If it is decided in step S603 that the joy-stick has not been operated in the right direction, the operation proceeds to step S610 and if it is decided in step S610 that the joy-stick has been operated in the left direction, the operation proceeds to step S611, in which a new display direction is set toward the left by 10 degrees relative to the immediately preceding display direction before the bird's-eye view map display processing is executed in step S612. Then, if it is decided in step S613 that the joy-stick has been operated in the left direction continuously for a specific length of time, the operation returns to step S611, whereas, if a negative decision is made in step S613, the processing is terminated and the operation returns.

Figure 7B:
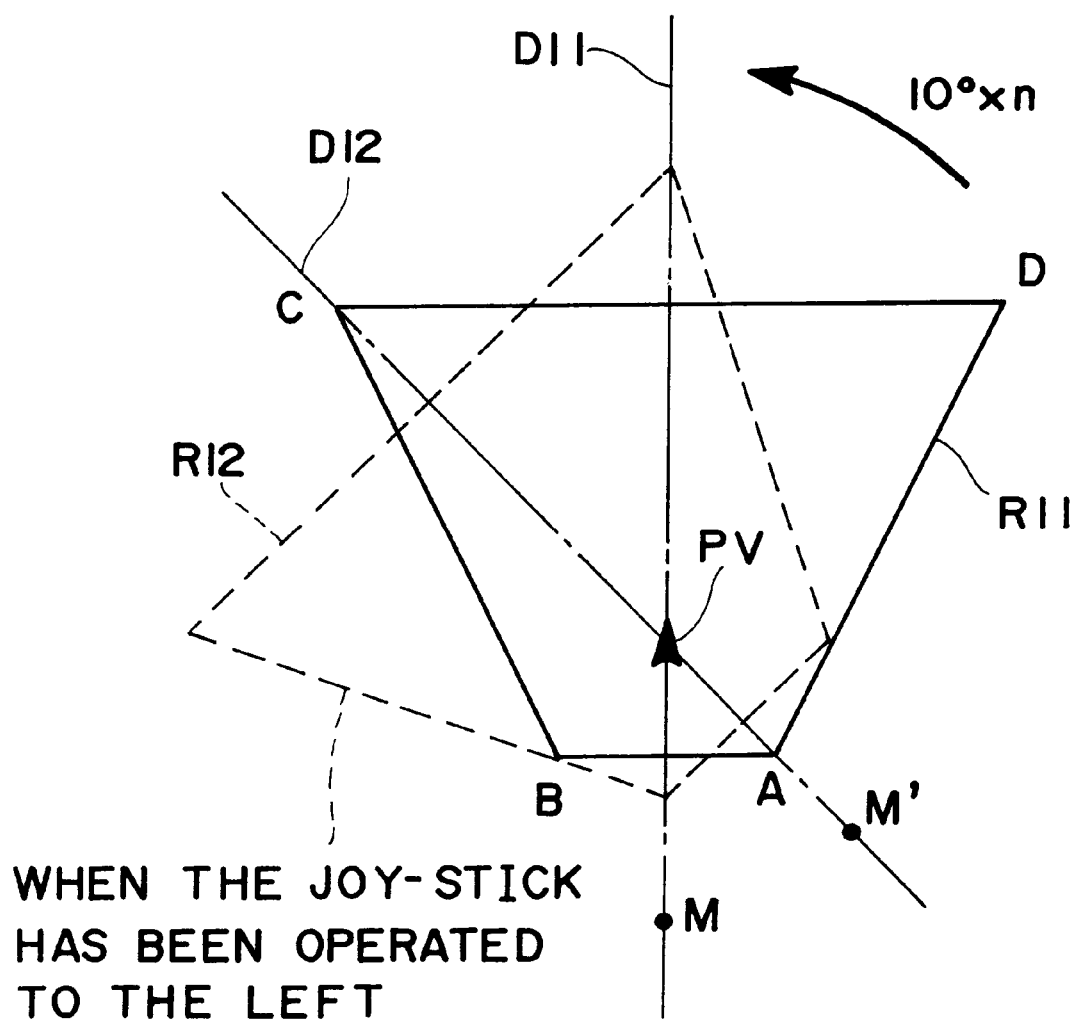
FIG. 7B is another illustration of change in the display direction of the bird's-eye view map.

FIG. 7B illustrates the display direction of the bird's-eye view map when the joy-stick 7a has been operated in the left direction. If the display direction and the display range before the operation of the joy-stick 7a are designated D11 and R11 respectively, the display direction D12 is a direction obtained by rotating the display direction D11 to the left by (10×n) degrees around the vehicle current position PV and the display range R12 is the area enclosed by the broken lines. As a result, if the display direction D11 is the vehicle advancing direction, more of the road state on the left hand side relative to the advancing direction is displayed within the screen.

As FIGS. 7A and 7B clearly indicate, when the joy-stick 7a has not been operated, the viewpoint M is set in the sky on the opposite side of the current position PV of the vehicle, relative to the vehicle advancing direction D1. On the other hand, when the joy-stick 7a has been operated, the viewpoint M' is set on the line D2 which intersects the line D1 connecting the viewpoint M and the current position PV on the current position PV at an angle (10×n) degrees, which corresponds to the joy-stick operation, and is set in the sky on the opposite side of the current position relative to the display direction. In other words, the trapezoidal area ABCD rotates around the vehicle current position PV. In such an embodiment, the vehicle current position mark is always displayed at a constant position within the display screen.

Note that as a method for changing the bird's-eye view map display direction, instead of rotating the trapezoidal area ABCD around the vehicle current position PV, the trapezoidal area ABCD may be caused to rotate around the viewpoint M. In that case, the display position of the vehicle position mark on the display device 6 changes as the bird's-eye view map display direction is changed.

<Current Position Button Operation Processing Flowchart>

Figure 9:
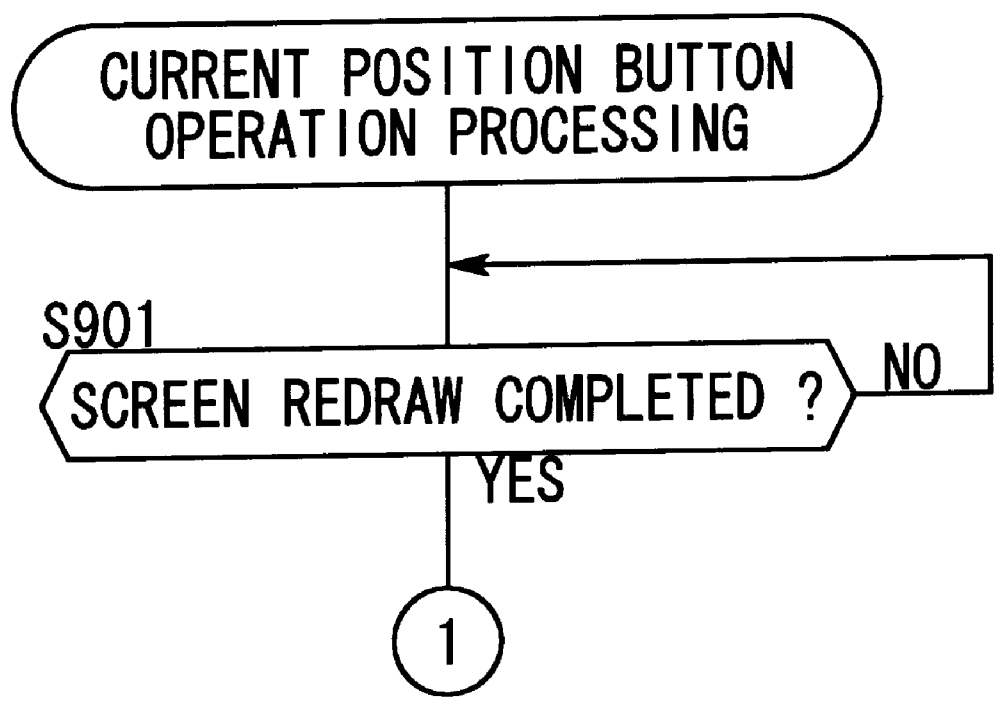
FIG. 9 is a flowchart illustrating the processing performed when the current position button has been operated.

FIG. 9 is a flowchart of the processing which interrupts when the current position button 7b has been operated. The operation remains in standby until the screen redraw is completed in step S901 and when the screen redraw ends, the operation proceeds to step S1, shown in FIG. 2 to execute the main processing described earlier. Consequently, even when the display direction of the bird's-eye view map is rotating to the left or right from the vehicle advancing direction by tilting the joy-stick 7a to the left or right, by operating the current position button 7b, the display of the bird's-eye view map is changed with the display direction being the vehicle advancing direction.

Through the processing explained above, the bird's-eye view map is displayed in the following manner. When the vehicle starts traveling, the control circuit 3 detects the current position and the advancing direction of the vehicle, and sets the look-down direction from the viewpoint, i.e., the display direction. Next, road map data are read from the map storage memory 2 based upon the current position and the look-down direction. Data, the classification of which satisfies specific conditions, are extracted from the road map data thus read and the extracted data are converted to bird's-eye view map data. Then, the bearing character notation indicating the display direction of the bird's-eye view map and the character notations that represent the two bearings adjacent to it are selected to create a set of bearing information image data. In addition, vehicle information image data required for displaying a vehicle mark to indicate the current position and the advancing direction of the vehicle are created. When the preparation of the map image data, the bearing information image data and the vehicle information image data is completed, these data are displayed on the display device 6 before the current position of the vehicle position is detected again.

FIG. 8A shows an example of display on the display device 6 when the vehicle advancing direction is set for the display direction in this manner. For the bearing information in the upper left area on the screen, NW indicating northwest and NE indicating north-east are displayed at the left and right of N, which indicates that the bearing of the vehicle advancing direction is north. Note that filled triangles are displayed above and below the N to indicate that the vehicle advancing direction is north.

Figure 8B:
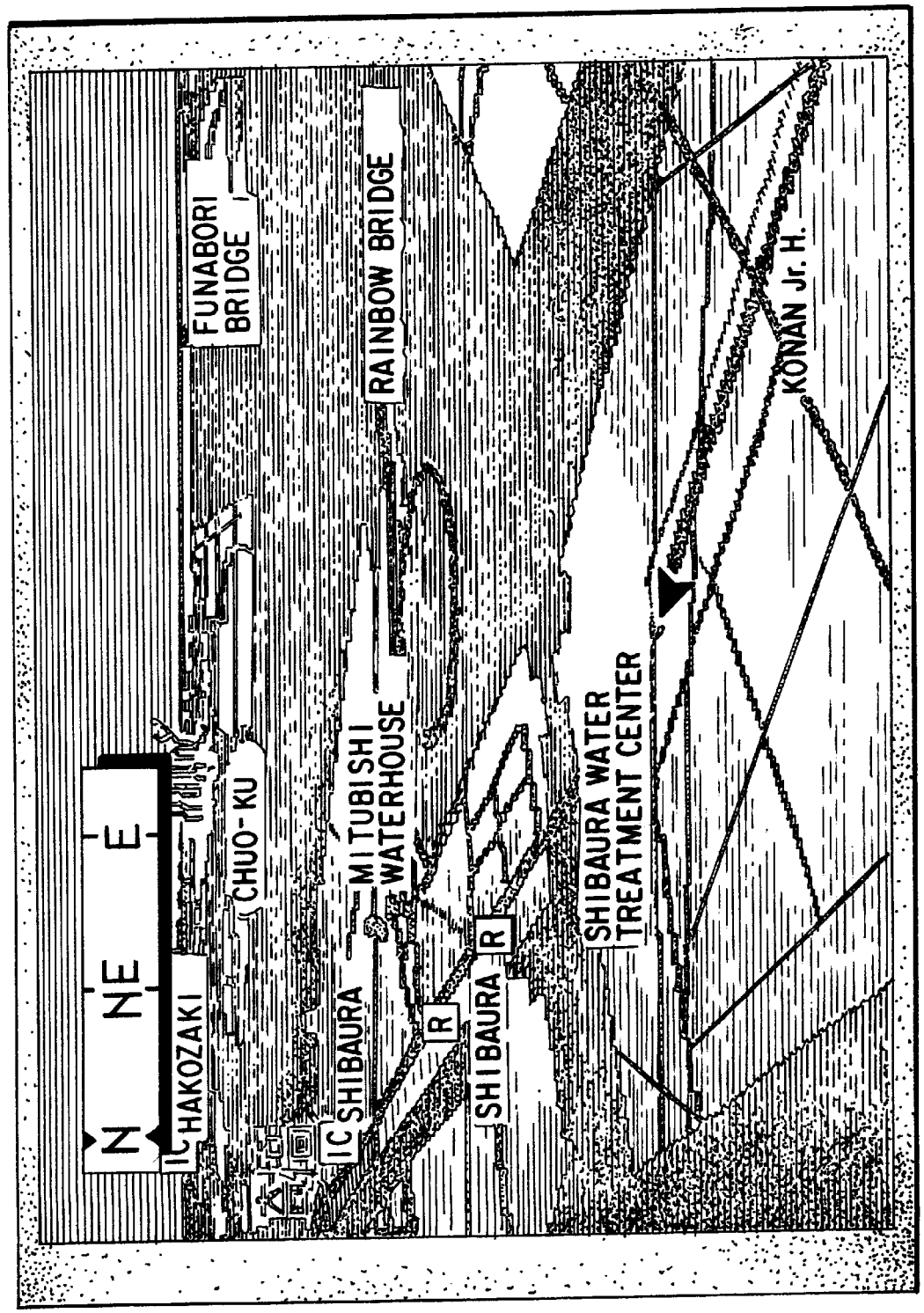
FIG. 8B is another example of bird's-eye view map display.

In this embodiment, while the bird's-eye view map is displayed on the display device 6, with the vehicle advancing direction normally set for the display direction, as shown in FIG. 8A, if the joy-stick 7a is operated either in the left or right direction, a bird's-eye view map with its display direction rotated to the left or right relative to the vehicle advancing direction is displayed on the display device 6. FIG. 8B shows an example of a display when the display direction has been rotated in the clockwise direction relative to the vehicle advancing direction by tilting the joy-stick 7a to the right and more information is displayed in the range on the right hand side in the vehicle advancing direction. In addition, in the bearing information in the upper left area of the screen, N indicating north, and E indicating east are displayed to the left and right of NE, which indicates north-east, i.e., the display direction of the bird's-eye view map. Note that the filled triangles are displayed above and below N indicating that the vehicle advancing direction is north.

Since the bird's-eye view map is displayed on the display device, normally with the vehicle advancing direction set for the display direction and the bird's-eye view map is displayed with the display direction changed in correspondence to the operation of the joy-stick 7a being tilted to the left or right in this manner, road state in the range extending to the left and right relative to the vehicle advancing direction can be ascertained. In addition, the bearing information indicating the display direction of the bird's-eye view map is displayed along with the adjacent bearing information and also a mark for identifying the bearing of the vehicle advancing direction is added, making it possible to ascertain both the display direction of the bird's-eye view map and the vehicle advancing direction. Note that since the bearing of the display direction is displayed, even when the advancing direction of the vehicle suddenly changes due to an abrupt curve or the like while displaying the advancing direction of the vehicle, consequently changing the display direction of the bird's-eye view map suddenly, for instance, the driver will not become disoriented on the map.

While, in the embodiment described above, a joy-stick that may be operated in 8 directions, i.e., up, down, left, right, diagonally upward to the right, diagonally downward to the right, diagonally upward to the left and diagonally downward to the left is used and the bird's-eye view map display is rotated only when the joy-stick 7a is operated to the left or the right, the display direction of the bird's-eye view map may be changed in the right direction when the joy-stick has been operated diagonally upward to the right or diagonally downward to the right and may be changed in the left direction when the joy-stick has been operated diagonally upward to the left or diagonally downward to the left. And also the display direction of the bird's-eye view map may be changed to a direction at once to which the joy-stick 7a is operated, that is a direction which the joy-stick 7a has designated among above mentioned 8 directions. Moreover, if a joy-stick can be operated more finely than the above-mentioned 8 directions and can output a signal corresponding to this operation, the bird's-eye view map can be rotated at once to the optional display direction. The operating member for changing the display direction of the bird's-eye view map is not limited to a joy-stick, and may be constituted with an operating button or an operating switch. In addition, while the joy-stick 7a of the remote control device 7 is used to change the display direction of the bird's-eye view map, such an operating member may be provided at the display panel.

While, in the embodiment described above, the road map in the advancing direction of the vehicle is normally displayed as a bird's-eye view map, the road map in the direction of the destination or the direction of the passing point located between the current position and the destination, for instance, may be displayed as a bird's-eye view map.

What is claimed is:

1. A map display apparatus comprising:
   a road map storage device that stores road map data related to a road map;
   a vehicle position detection device that detects a current position of a vehicle;
   a display device that displays a road map in a bird's-eye view format based upon bird's-eye view map data that are input;
   a bird's-eye view map data creation circuit that creates said bird's-eye view map data in said bird's-eye view format obtained by looking down at said road map diagonally in a predefined specific direction from a viewpoint above a vicinity of said current position of said vehicle on said road map, based upon said road map data read from said road map storage device and said current position of said vehicle detected by said vehicle position detection device;
   a direction change operating member that is operated in order to change said specific direction that is used when said bird's-eye view map data is created;
   a control circuit that controls said bird's-eye view map data creation circuit so as to create said bird's-eye view map data in said specific direction which is changed in response to an operation of said direction change operating member when said direction change operating member has been operated; and
   a bearing information data creation circuit that creates data concerning bearing information to indicate at least one of said predefined specific direction and said changed specific direction, said control circuit controlling the display device so that said bearing information is displayed within a display screen of said display device.

2. A map display apparatus according to claim 1, wherein said control circuit controls said bird's-eye view map data creation circuit so as to create said bird's-eye view map data in said specific direction which is changed by a predefined angle in response to each operation of said direction change operating member.

3. A map display apparatus according to claim 1, wherein:
   said direction change operating member is a member that can designate an optional angle a range of which is from 0 degree through 360 degrees relative to said specific direction; and
   said control circuit controls said bird's-eye view map data creation circuit so as to create said bird's-eye view map data in said specific direction which is changed by said optional angle designated by said direction change operating member.

4. A map display apparatus according to claim 1, further comprising:

an advancing direction detection device that detects a direction in which the vehicle is advancing, wherein:

said control circuit controls said bird's-eye view-data creation circuit so that, (1) when said direction change operating member has not been operated, said bird's-eye view-data creation circuit creates said bird's-eye view map data in said specific direction being said vehicle advancing direction detected by said advancing direction detection device, and (2) when said direction change operating member has been operated, said bird's-eye view-data creation circuit creates said bird's-eye view map data in said specific direction rotated in a clockwise direction or a counter-clockwise direction by a specific angle relative to said vehicle advancing direction.

5. A map display apparatus according to claim 1, wherein:

said direction change operating member is a joy-stick that is operated in left and right directions.

6. A map display apparatus according to claim 1, wherein:

said direction change operating member is a joy-stick that is operated in 8 directions, including up, down, left and right directions; and said control circuit changes said specific direction by determining that said joy-stick has been operated left or right based upon a signal generated when said joy-stick has been operated in a direction other than up or down.

7. A map display apparatus comprising:

a road map storage means for storing road map data related to a road map;

a vehicle position detection means for detecting a current position of a vehicle;

a display means for displaying said road map in a bird's-eye view format based upon bird's-eye view map data that are input;

a bird's-eye view map data creation means for creating said bird's-eye view map data in said bird's-eye view format obtained by looking down at said road map diagonally in a predefined specific direction from a viewpoint above a vicinity of said current position of said vehicle on said road map, based upon said road map data read from said road map storage means and said current position of said vehicle detected by said vehicle position detection means;

a direction change operating member that is operated in order to change said specific direction that is used when said bird's-eye view map data is created;

a control means for controlling said bird's-eye view map data creation means so as to create said bird's-eye view map data in said specific direction changed in response to an operation of said direction change operating member when said direction change operating member has been operated; and a bearing information data creation means for creating data concerning bearing information to indicate at least one of said predefined specific direction and said changed specific direction, said control means controlling the display means so that said bearing information is displayed within a display screen of said display means.

8. A map display apparatus comprising:

a data conversion circuit that converts a plane map data to a bird's-eye view map data in a specific bird's-eye viewing direction in order to display a map in a bird's-eye view format;

an operating member that is operated to change said specific bird's-eye viewing direction; and a control circuit operating to display bearing information indicating at least one of said specific bird's-eye viewing direction and said changed specific bird's-eye viewing direction along with said map in a bird's-eye view format.

9. A map display apparatus according to claim 8, wherein said data conversion circuit converts said plane map data to said bird's-eye view map data in said specific bird's-eye viewing direction changed by a predefined angle in response to each operation of said operating member.

10. A map display apparatus according to claim 8, wherein:

said operating member is a member that can designate an optional angle a range of which is from 0 degree through 360 degrees relative to said specific bird's-eye viewing direction; and said data conversion circuit converts said plane map data to said bird's-eye view map data in said specific bird's-eye viewing direction changed by said optional angle designated by said operating member.

* * * * *